United States Patent
Bier

(10) Patent No.: US 9,815,647 B2
(45) Date of Patent: Nov. 14, 2017

(54) DEVICE FOR INSCRIPTION OF IDENTIFICATION UNITS

(71) Applicant: Murrplastik Systemtechnik GmbH, Oppenweiler (DE)

(72) Inventor: Klaus-Dieter Bier, Leutenbach (DE)

(73) Assignee: Murrplastik Systemtechnik GmbH, Oppenweiler (DE)

( * ) Notice: Subject to any disclaimer, the term of this patent is extended or adjusted under 35 U.S.C. 154(b) by 0 days.

(21) Appl. No.: 15/120,338

(22) PCT Filed: Mar. 2, 2015

(86) PCT No.: PCT/EP2015/054267
§ 371 (c)(1),
(2) Date: Aug. 19, 2016

(87) PCT Pub. No.: WO2015/144392
PCT Pub. Date: Oct. 1, 2015

(65) Prior Publication Data
US 2017/0113890 A1    Apr. 27, 2017

(30) Foreign Application Priority Data
Mar. 27, 2014   (DE) .................. 10 2014 004 353

(51) Int. Cl.
*B65H 5/00*       (2006.01)
*B65H 3/24*       (2006.01)
(Continued)

(52) U.S. Cl.
CPC ............. *B65H 3/24* (2013.01); *B65G 59/062* (2013.01); *B65H 1/06* (2013.01); *B65H 3/30* (2013.01);
(Continued)

(58) Field of Classification Search
CPC .. B65H 1/06; B65H 3/24; B65H 3/242; B65H 3/32; B65H 3/322; B65H 3/50;
(Continued)

(56) References Cited

U.S. PATENT DOCUMENTS

| | | | | |
|---|---|---|---|---|
| 1,158,045 A | * | 10/1915 | Graham | B65G 59/062 101/47 |
| 3,877,608 A | * | 4/1975 | Jureit | B65G 59/062 221/236 |

(Continued)

FOREIGN PATENT DOCUMENTS

| | | |
|---|---|---|
| DE | 101 43 802 A1 | 3/2003 |
| DE | 101 53 024 A1 | 5/2003 |

(Continued)

OTHER PUBLICATIONS

International Search Report of PCT/EP2015/054267, mailed Aug. 25, 2016.

(Continued)

*Primary Examiner* — Prasad V Gokhale
(74) *Attorney, Agent, or Firm* — Collard & Roe, P.C.

(57) ABSTRACT

A device for inscription of identification units, wherein each identification unit has an identification plate or several one-piece contiguous identification plates, wherein each identification plate has an inscription surface and wherein the inscription surface or several inscription surfaces of each identification unit spans or span an inscription plane, includes: a magazine for holding a number of identification units bearing against one another with inscription planes oriented parallel to one another, the magazine having two guide walls for the identification units, which walls are spaced apart and extend parallel to one another or along a conveying direction extending perpendicular to the inscription planes and reduce the reciprocal spacing; a contact surface for the identification unit, which surface is disposed (Continued)

after the guide walls in the conveying direction; an inscription implement for inscription of the inscription surfaces; a chute which is accessible via an inlet opening in the contact surface accessible for transport of the identification units to the inscription implement and/or to a removal point, wherein the peripheral edge of the inlet opening has two edge portions which lie opposite one another, and the spacing of the edge portions relative to one another is smaller than the spacing relative to one another of the edges of the guide walls facing the support surface; and a slide arrangement disposed above the support surface and having at least one slide element, wherein the at least one slide element is movable from a retracted position spaced apart from an associated edge portion into a feed position in which the edge of the slide element facing the inlet opening is flush with the associated edge portion or projects beyond the associated edge portion.

14 Claims, 9 Drawing Sheets

(51) Int. Cl.
   *B65H 3/30*     (2006.01)
   *B65G 59/06*    (2006.01)
   *B65H 1/06*     (2006.01)

(52) U.S. Cl.
   CPC .......... *B65H 2301/423225* (2013.01); *B65H 2404/692* (2013.01); *B65H 2404/725* (2013.01); *B65H 2404/732* (2013.01); *B65H 2404/733* (2013.01); *B65H 2405/323* (2013.01)

(58) Field of Classification Search
   CPC ...... B65H 3/56; B65H 3/30; B65H 2404/692; B65H 2404/725; B65H 2404/732; B65H 2404/733; B65H 2405/321; B65H 2405/323; B65H 2301/423225; B65G 59/062
   See application file for complete search history.

(56) References Cited

U.S. PATENT DOCUMENTS

| | | | | |
|---|---|---|---|---|
| 3,997,067 A | * | 12/1976 | Murata | B65G 59/062 198/468.2 |
| 4,439,262 A | * | 3/1984 | Zodrow | B65C 9/10 156/364 |
| 4,897,019 A | * | 1/1990 | Lemaire | B65G 59/062 221/223 |
| 6,056,150 A | * | 5/2000 | Kasper | B65H 1/06 209/657 |
| 6,098,839 A | * | 8/2000 | Hunnell | B65H 1/06 221/197 |
| 6,135,314 A | * | 10/2000 | Menes | B65H 1/06 221/232 |
| 6,814,257 B2 | | 11/2004 | Kiene et al. | |
| 2005/0082738 A1 | | 4/2005 | Bryant et al. | |
| 2015/0217582 A1 | * | 8/2015 | Speith | B65H 3/24 271/131 |

FOREIGN PATENT DOCUMENTS

| | | |
|---|---|---|
| DE | 20 2012 101 998 U1 | 9/2013 |
| EP | 0 885 824 A2 | 12/1998 |
| GB | 752 197 A | 7/1956 |
| JP | S 64-26649 U | 2/1989 |
| JP | S64-26649 U | 2/1989 |
| JP | H 01-96446 U | 6/1989 |
| JP | H01-96446 U | 6/1989 |
| JP | H04-15728 Y2 | 4/1992 |
| JP | 08040555 A * | 2/1996 ........... B65G 59/062 |
| JP | 08040555 A * | 2/1996 ........... B65G 59/062 |

OTHER PUBLICATIONS

German Search Report in DE 10 2014 004 353.3, mailed Oct. 23, 2014 with English translation of relevant parts.

* cited by examiner

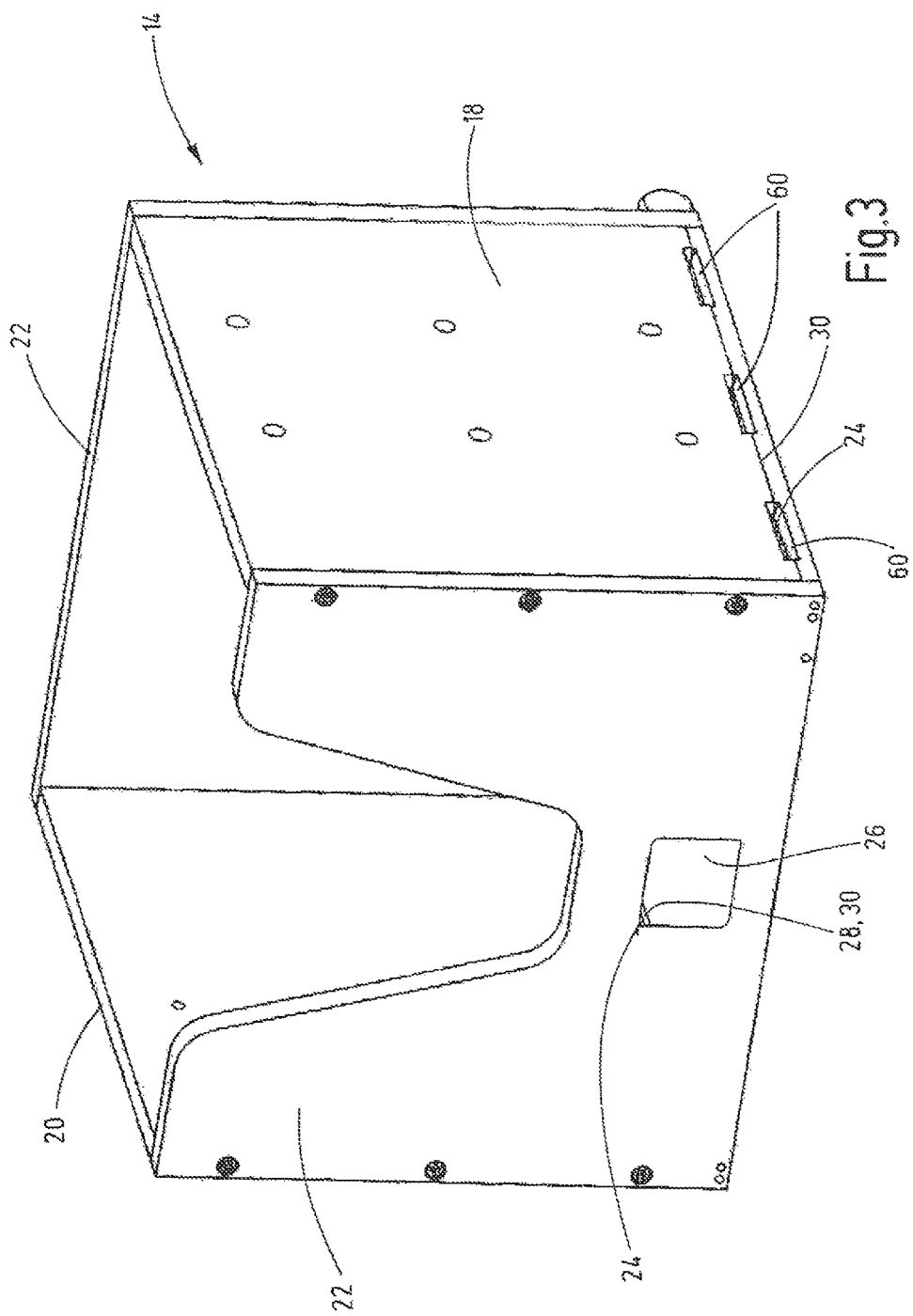

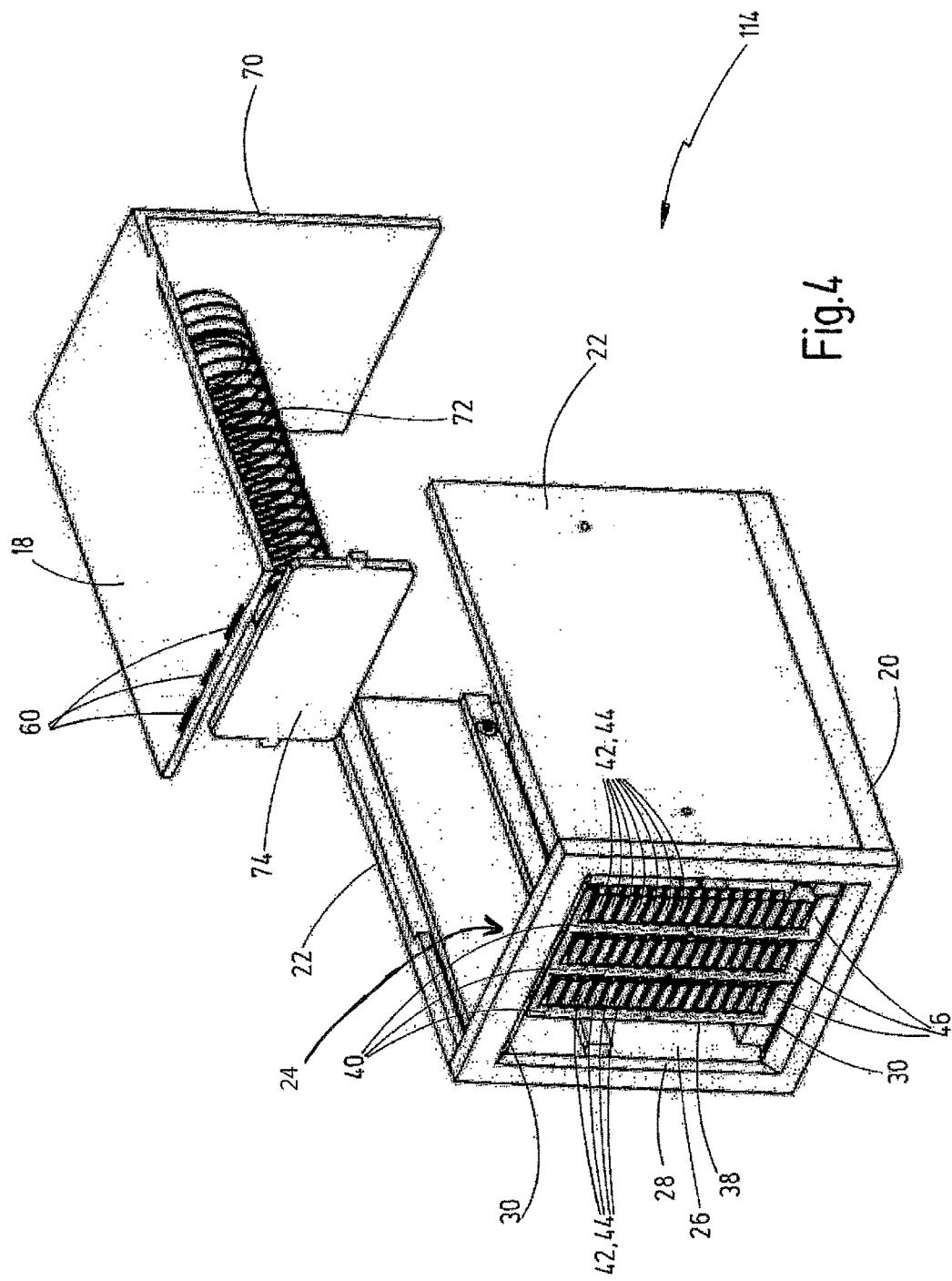

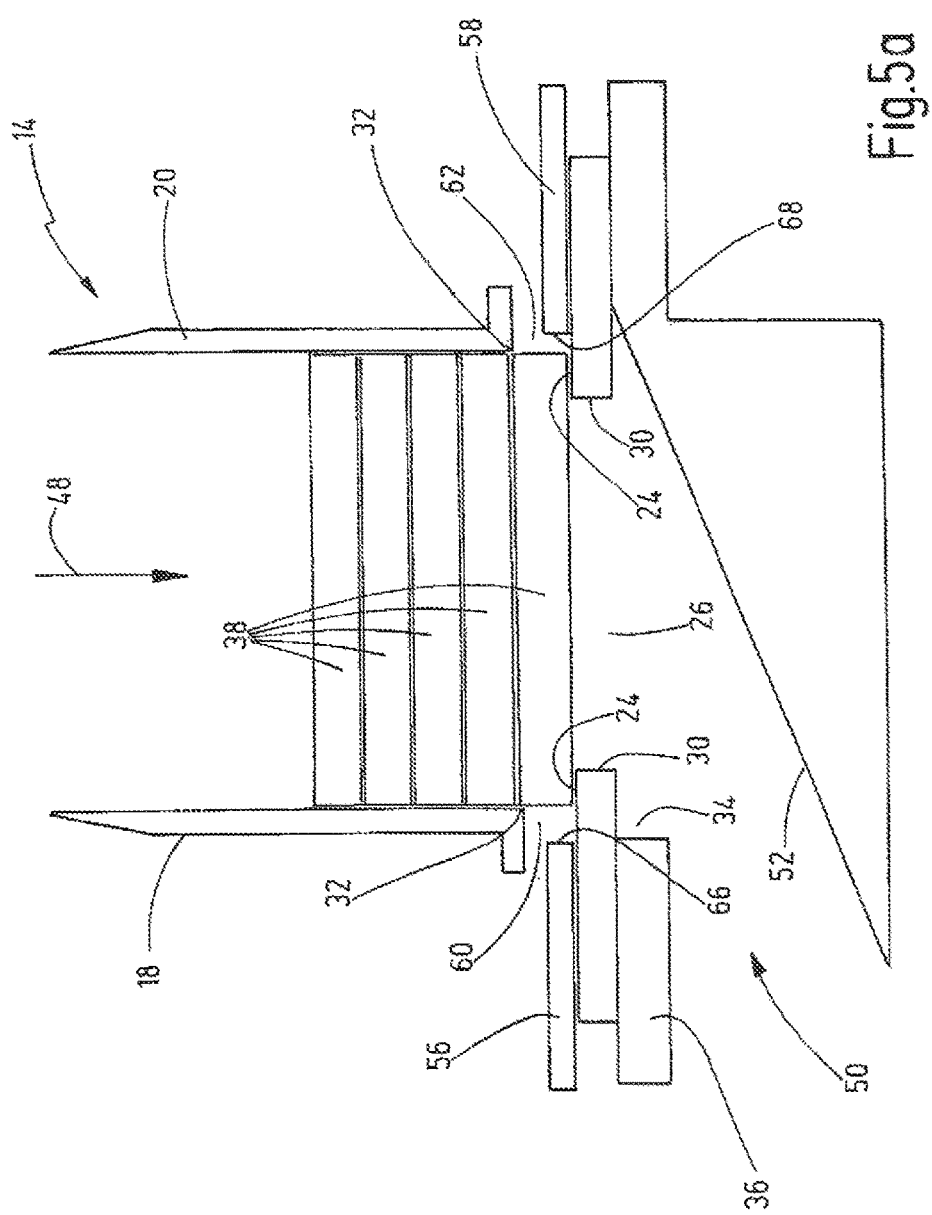

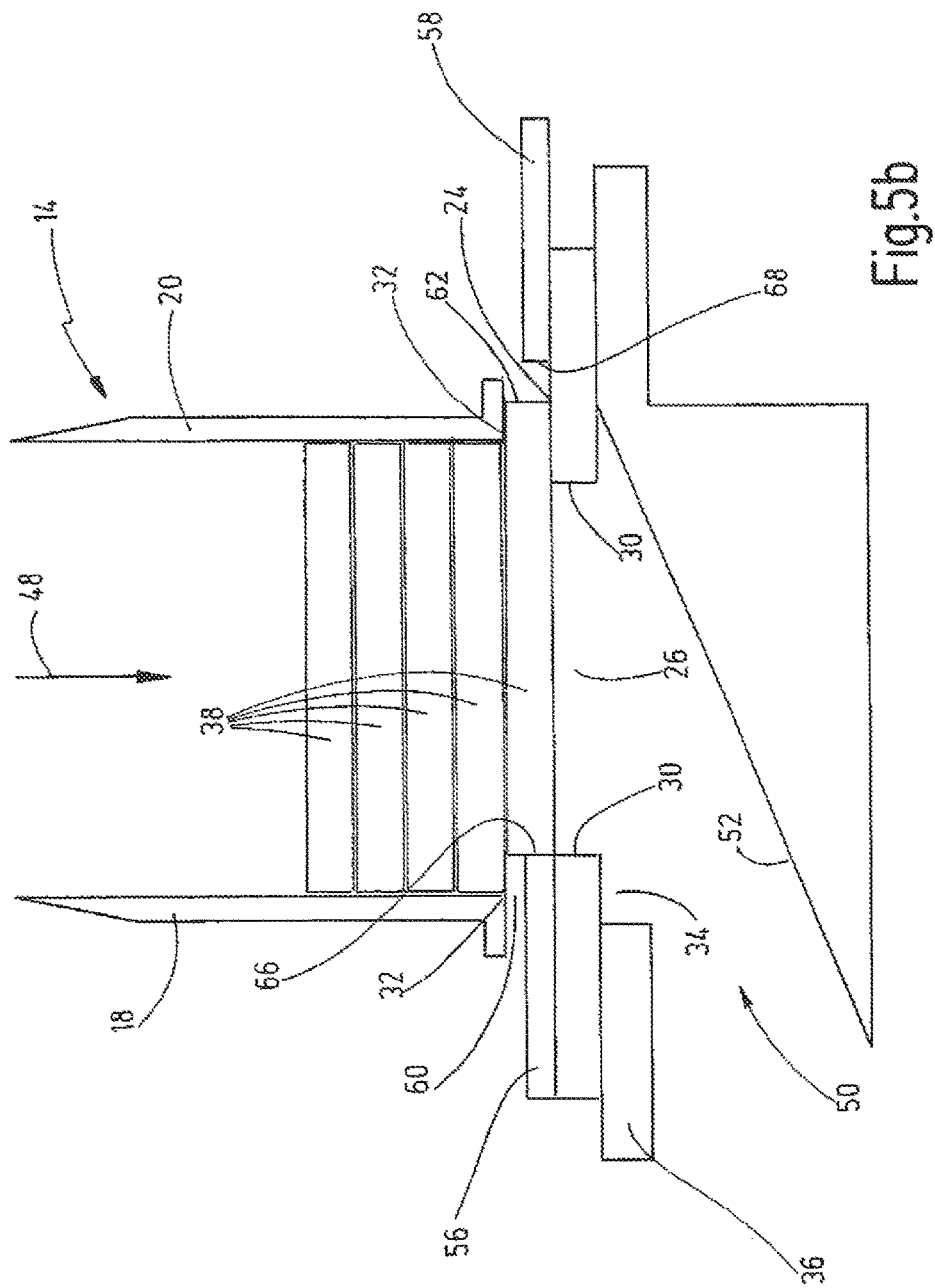

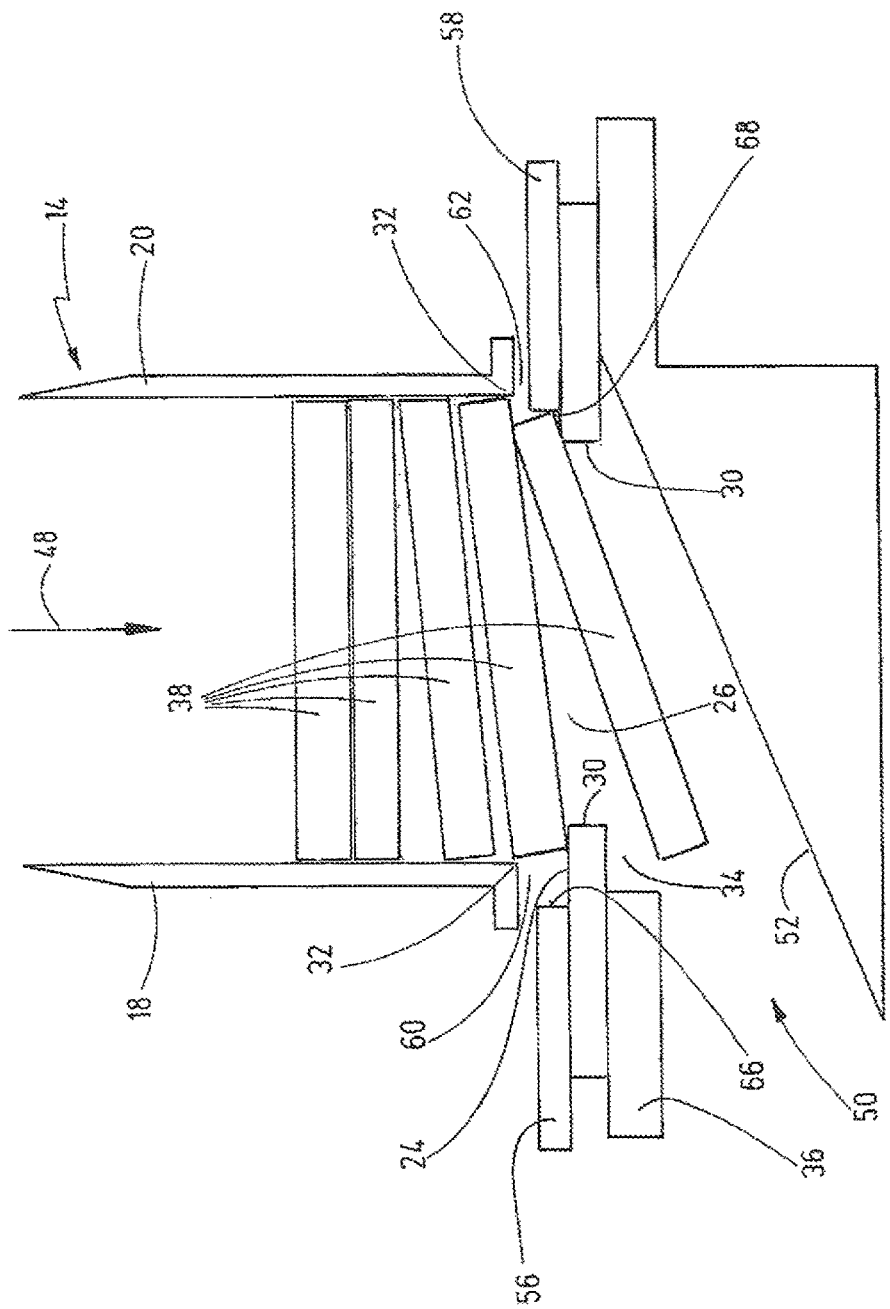

DEVICE FOR INSCRIPTION OF IDENTIFICATION UNITS

CROSS REFERENCE TO RELATED APPLICATIONS

This application is the National Stage of PCT/EP2015/054267 filed on Mar. 2, 2015, which claims priority under 35 U.S.C. §119 of German Application No. 10 2014 004 353.3 filed on Mar. 27, 2014, the disclosures of which are incorporated by reference. The international application under PCT article 21(2) was not published in English.

The invention relates to a device for inscription of identification units, wherein each identification unit has an identification plaque or several identification plaques joined together in one piece.

Identification plaques are frequently used for identification of components. For this purpose they have an inscription surface on which an inscription can be applied that designates the component to be identified. In particular, cables are frequently provided with identification plaques, which are fastened by means, for example, of grommets pushed onto the cables and which bear inscriptions identifying the cables. For application of the inscription on the inscription surface specific to each identification plaque, the most diverse instruments are known, for example laser printers, thermal transfer printers, plotters or engraving instruments. It is common to all that the identification plaques must be fed to the inscription instrument. This is usually done manually, wherein the identification plaques are placed individually or as an identification-plaque set joined together in one piece on a support surface and inscribed there. This is laborious and time-consuming.

It is therefore the task of the invention to develop a device of the type mentioned in the introduction that permits a simpler inscription of the identification plaques.

This task is accomplished according to the invention by the devices described herein. Advantageous improvements of the invention are also described herein.

The invention is based on the idea of feeding the identification units, which have one or more identification plaques, in defined manner to the inscription instrument and of providing a reliable and easy-to-operate ability to introduce the identification units into a chute used for the transport to the inscription instrument and/or to a removal point. For this purpose a pusher arrangement is provided that has at least one pusher element that is disposed above the support surface in the sense that it is movable at a spacing from it or, resting on it, parallel to it, and that is displaceable from a retracted position at a spacing from an associated rim portion of the peripheral rim of the inlet opening to a forward position, in which its edge turned toward the inlet opening is flush with the associated rim portion or projects beyond this, so that this pusher element can push the identification unit resting on the support surface so far forward that it drops into the inlet opening. Preferably the pusher arrangement has two pusher elements disposed at a spacing from one another, wherein these are disposed at a spacing relative to one another that is larger than the mutual spacing of the rim portions and preferably exceeds this by at least 1 cm, if possible by at least 2 cm, so that sufficient space for laying the identification units on the support surface is present on both sides of the inlet opening. Each of the pusher elements is then displaceable from a retracted position at a spacing from the associated rim portion to a forward position, in which its edge turned toward the inlet opening is flush with the associated rim portion or projects beyond this. According to an advantageous improvement, the mutual spacing of the pusher elements is at least as large as the mutual spacing of the rims of the guide walls turned toward the support surface. The spacing of the guide walls, especially in the region turned toward the support surface, may be matched to the size of the identification units in such a way that these are guided between the guide walls with little clearance and can be deflected only slightly or not at all upon the occurrence of forces acting transversely relative to the transport direction. The respective identification unit resting on the support surface is then positioned between the pusher elements and can be pushed by alternating advancing of the pusher elements into their respective forward position via the inlet opening into the chute. The inscription can be applied in the chute, wherein the identification units are positioned in defined manner there at a point, or the identification unit resting respectively on the support surface can be inscribed through the inlet opening on its inscription surface or on its inscription surfaces.

Expediently, each pusher element has a smaller thickness, measured perpendicular to the support surface, than the identification units. Thereby it is ensured that, during an advancing of the pusher element or of the pusher elements, respectively only the identification unit resting on the support surface will be pushed, without the need to take precautions to hold back the other identification units present in the magazine. If two pusher elements are present, they may be individually movable. However, since they are always advanced alternately, it is preferred that they be rigidly connected to one another and preferably joined together in one piece, so that the advancing process can be configured more simply. Expediently, the at least one pusher element engages through at least one slot in the associated guide wall.

The rim portions of the inlet opening disposed opposite one another may be movable relative to one another for variation of the size of the inlet opening. Thereby the device according to the invention is usable for identification units of different sizes that are resting on the support surface on both sides of the inlet opening. Especially during use of a laser inscription instrument, it is preferred that the inscription instrument and the chute are enclosed by a housing, so that neither laser radiation harmful for the eye of the user nor harmful vapors can escape to the surroundings. The magazine is then expediently connected detachably with the housing or is inserted loose into a holder in the housing, so that it can be removed after emptying and replaced by a filled magazine. In this connection it is further preferred that the support surface, as part of the magazine, be securely connected with the guide walls.

According to a preferred embodiment, the guide walls run perpendicularly or in sloping manner from top to bottom, and the support surface is disposed under the guide walls. This has the advantage that the identification units can drop one after the other by virtue of their force of gravity into the inlet opening, without the need for a further exertion of force for this purpose. According to an alternative embodiment, the support surface is inclined relative to the horizontal and preferably aligned vertically, so that the transport direction runs substantially horizontally or with slight inclination relative to the horizontal. In this case a feed element for advancing of the identification units in the transport direction and for pressing of the identification units onto the support surface is needed, which element is expediently spring-assisted and advances the identification units so that the identification unit disposed closest to the inlet opening can be pressed into the inlet opening. However, such a spring-assisted feed element may also be provided in horizontal alignment of the support surface.

According to an advantageous improvement of the invention, a first of the guide walls has two guide ribs protruding in the direction of the second guide wall and extending at a spacing relative to one another in transport direction. This is advantageous in particular because the identification units, which are manufactured and sold by the Applicant, are indeed manufactured in different widths but on one side are provided with a head region formed from inscription platelets, which has an identical width for each construction type. Identification units of equal length but different width may then also be received in the magazine, in which case their head parts are guided between the guide ribs. The spacing of the guide ribs relative to one another expediently decreases in the direction of towards the first guide wall. Thereby insertion chamfers are formed that facilitate introduction of the head parts between the guide ribs. A typical identification unit of the Applicant is described in DE 37 44 936 C2, to which reference is made in this connection.

An alternative embodiment provides that the identification units are first fed to the inscription instrument by means of the chute. For this purpose, a sloping plane inclined relative to the horizontal and constructed as a slideway for the identification units is disposed in the chute. At its lower end the slideway merges into a retaining surface, which at least at one lower rim is provided with an upwardly projecting stop rail or other positioning means, in order to be able to position an identification unit that has slid down the slideway in well defined manner. An identification unit positioned in such a way on the retaining surface is inscribed there by means of the inscription instrument on its inscription surface or on its inscription surfaces, for which purpose the inscription instrument is directed toward the retaining surface. Under these conditions, it is possible in particular for the retaining surface to be formed by a transparent plate, preferably a glass plate, and for the inscription instrument, to have a laser directed preferably perpendicularly onto the surface of the plate facing away from the retaining surface, so that the inscription is applied through the retaining surface. Advantageously, the retaining surface is inclined relative to the horizontal in two spatial directions and is provided respectively at two rims meeting at their lowermost point with an upwardly projecting stop rail. This permits a more precise positioning of the identification unit during the inscription, since with sufficient inclination in both spatial directions the identification unit is necessarily positioned such that it comes to rest with one corner at the lowermost point of the retaining surface. In order to achieve the most problem-free sliding possible of the identification units, the inclination of the slideway according to one exemplary embodiment is changed continuously at least in the end portion merging into the retaining surface, until it is identical with the inclination of the retaining surface. In addition, it is preferred that the retaining surface directly adjoins the slideway and is flush with it.

For a further transport of the inscribed identification units, at least one of the stop rails can advantageously be movable for release of an identification unit resting on the retaining surface. Upon removal of the stop rail in question, the identification unit is then able to slide further, in which case it is preferred in particular that a further portion of the chute leading to a removal point and/or to a receiving container-adjoins the retaining surface. In the receiving container, the identification units are stored after the inscription, until they are removed from the device.

The invention will be explained in more detail in the following on the basis of an exemplary embodiment illustrated schematically in the drawing, wherein FIGS. 1a, 1b show an inscription device in two different perspective views, each with partly demounted housing and without inscription instrument;

FIG. 3 shows the magazine according to FIGS. 1a, 1b in perspective view;

FIG. 4 shows a magazine according to an alternative exemplary embodiment, and

FIG. 5a to 5e show a schematic view of the mode of operation of the inscription device according to FIGS. 1a, 1b.

Figure 1A:
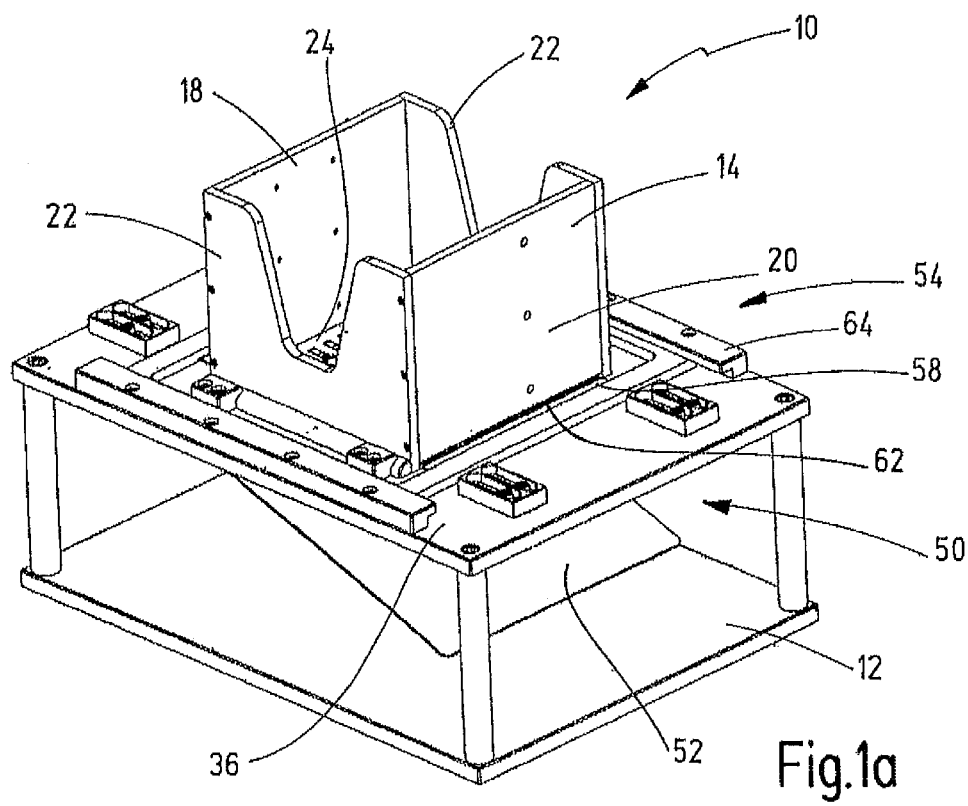
Figure 1B:
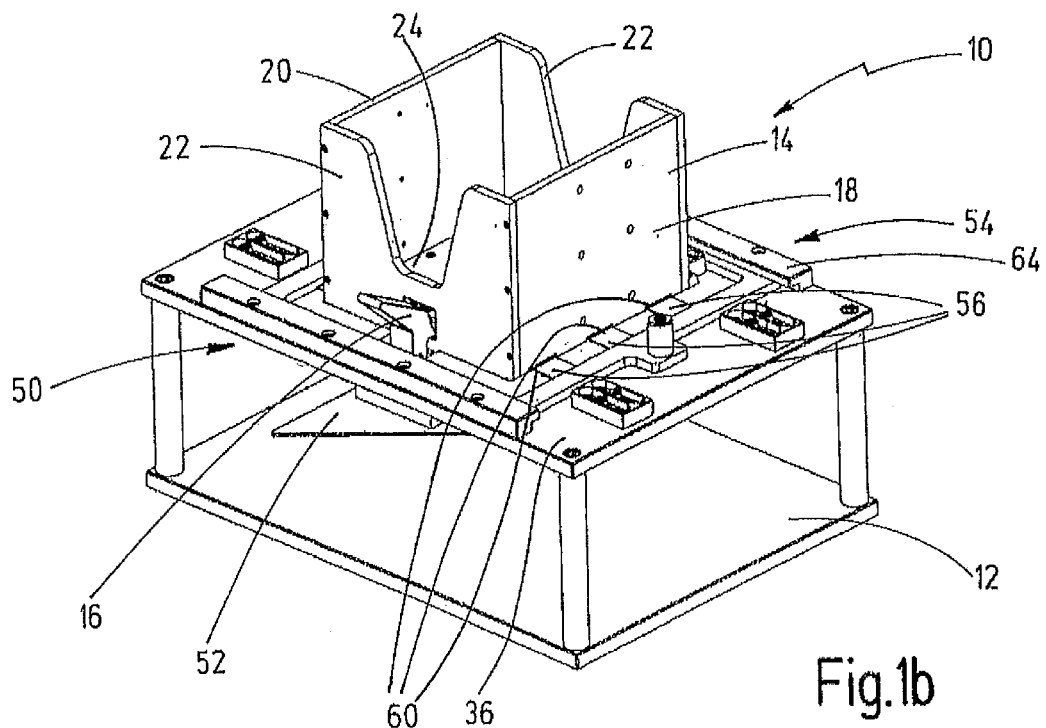
Figure 2:
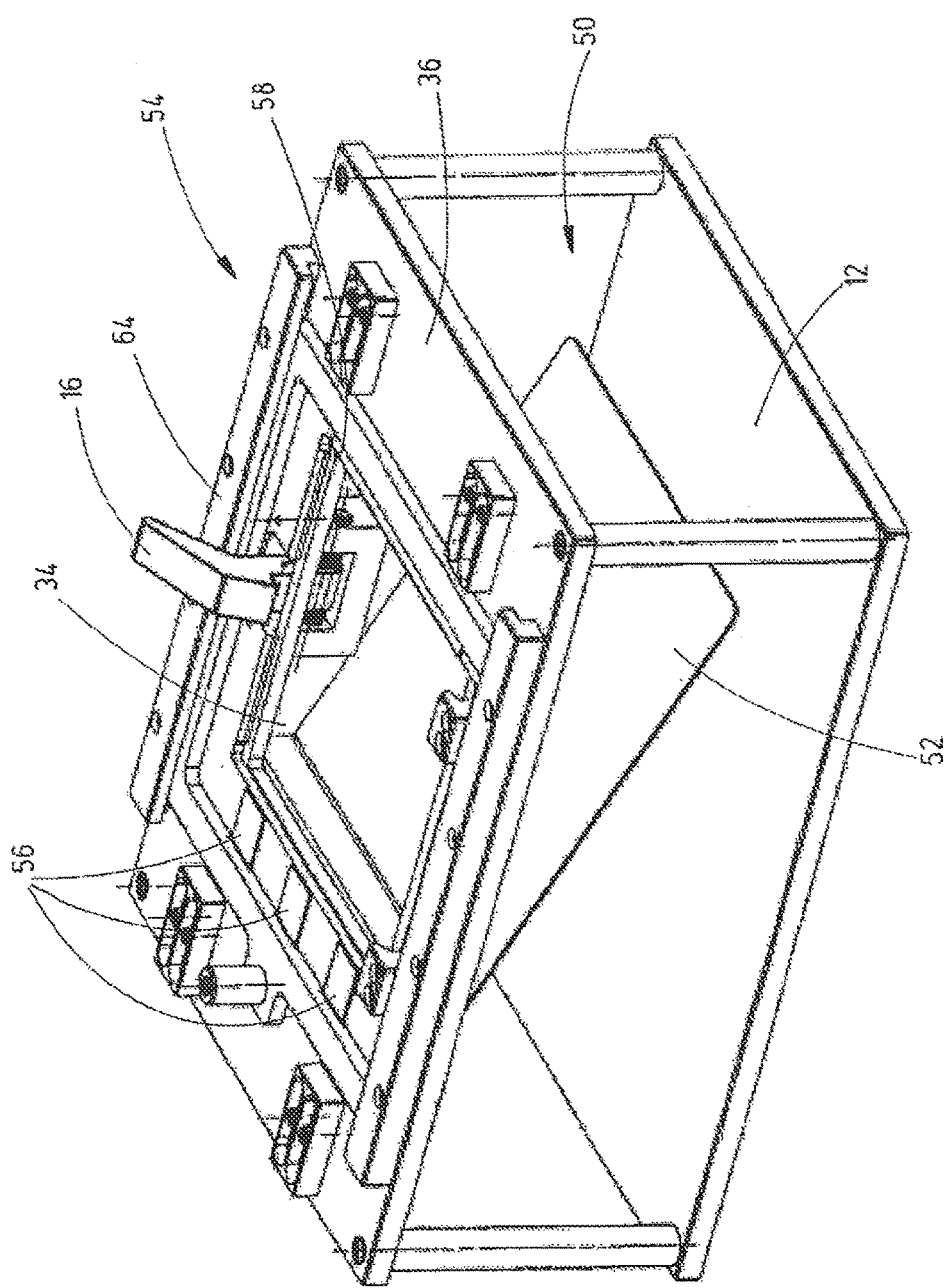
FIG. 2 shows the inscription device according to FIG. 1a without magazine.

The inscription device 10 according to FIGS. 1a, 1b has a housing 12, only partly represented in the drawing, in which an inscription instrument, not illustrated, is received. A magazine 14 is mounted on the housing 12 and fastened detachably by means of a snap-in hook 16. The magazine 14 has two vertically disposed guide walls 18, 20, which run parallel with a spacing relative to one another and which are joined to one another by means of transverse walls 22. In its lower region, the magazine 14 has a horizontally aligned support surface 24, in which an inlet opening 26 is located. The inlet opening 26 is enclosed by a peripheral rim 28, which has two rim portions 30 disposed opposite one another. The spacing of the two rim portions 30 relative to one another is smaller than the spacing of the guide walls 18, 20 relative to one another or of their lower rims 32 relative to one another, such that the support surface 24 is divided into two portions that respectively extend from one of the rim portions 30 to the lower rim 32 of the associated guide wall 18, 20. Underneath the inlet opening 26, an opening 34, which communicates with the inlet opening 26 and is at least as large as this, is disposed in a cover wall 36 of the housing 12.

The magazine 14 is designed to receive identification units, such as identification-plaque sets 38, for example, of which an example is indicated in FIG. 4. Identification-plaque sets 38 have a large number of plastic identification plaques 42, which are joined together in one piece and molded onto carriers 40 connected to one another, and each of which has an inscription surface 44. An inscription platelet 46 is molded onto the end of each carrier 40. The inscription surfaces 44 are arranged such that they span an inscription plane. The identification-plaque sets 38 are received in the magazine 14 in such a way that they rest on one another with inscription planes aligned parallel to one another. The spacing of the guide walls 18, 20 relative to one another is somewhat larger than the length of the identification-plaque sets 42, and so these are guided with some clearance between the guide walls 18, 20 in a transport direction 48 toward the inlet opening 26, which in the device 10 according to FIG. 1a, 1b runs perpendicularly downward. The inscription platelets 46 are turned toward the first guide wall 18, which can have guide ribs, not illustrated in the drawing, which extend in the transport direction 48 and project from the first guide wall 18 in the direction towards the second guide wall 20 and between which the inscription platelets 46 are guided.

A chute 50, which is used for the transport of the identification-plaque sets 38 to the inscription instrument, is disposed in the housing 12. In the chute 50, a slideway 52 is disposed, on which the identification-plaque sets 38 drop after the passage through the inlet opening 26 and the opening 34 in the cover wall 36 and on which they slide downward until they come into contact with a glass retaining plate, not illustrated in more detail, which is inclined in both spatial directions. In the shown exemplary embodiment, the inscription instrument is a laser, which inscribes the identification plaques 42 through the glass plate. The inscribed identification-plaque sets 38 are then transported via a further portion of the chute to a removal point or a receiving container. According to an alternative exemplary embodiment not illustrated in a drawing, however, it is also possible for the chute 50 to lead directly to the removal point or to the receiving container, while the identification plaques 42 are being inscribed through the inlet opening 26 by means of the inscription instrument. The inscription instrument is then directed at the inlet opening 26 and inscribes the identification plaques 42 of the identification-plaque set 38 respectively located lowest in the magazine 14.

In order to transport the identification-plaque sets 38 individually into the chute, a pusher arrangement 54 is provided, which in the exemplary embodiment shown here has two pusher elements 56, 58. The first pusher element 56 is constructed in comb-shaped manner with three plates rigidly joined to one another for urging the inscription platelets 46, and in the region of the first guide wall 18 is disposed above the support surface 24 in a manner engaging through slots 60 in the first guide wall 18. The second pusher element 58 has the form of one thin plate, and in the region of the second guide wall 20 is disposed above the support surface 24 in a manner engaging through one slot 62 in the second guide wall 20. The pusher arrangement 54 additionally has a frame 64, which joins the pusher elements 56, 58 rigidly with one another and which holds the first pusher element 56 at a spacing from the second pusher element 58 that is larger than the spacing of the lower rims 32 of the guide walls 18, 20 relative to one another and thus is larger than the length of the identification-plaque sets 38. The mode of operation of this pusher arrangement 54 is schematically illustrated in FIG. 5*a* to *e*.

Figure 5D:
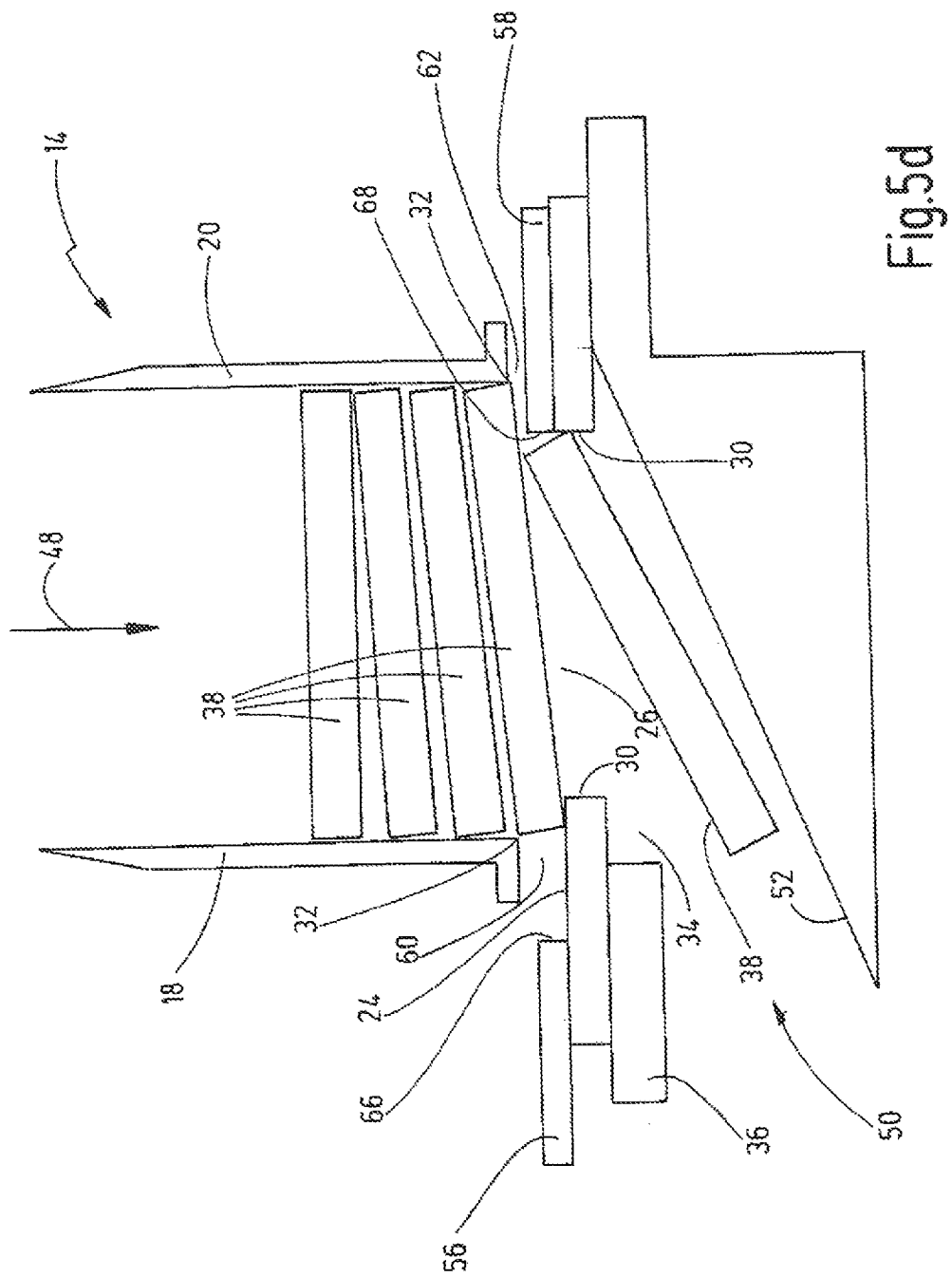
Figure 5E:
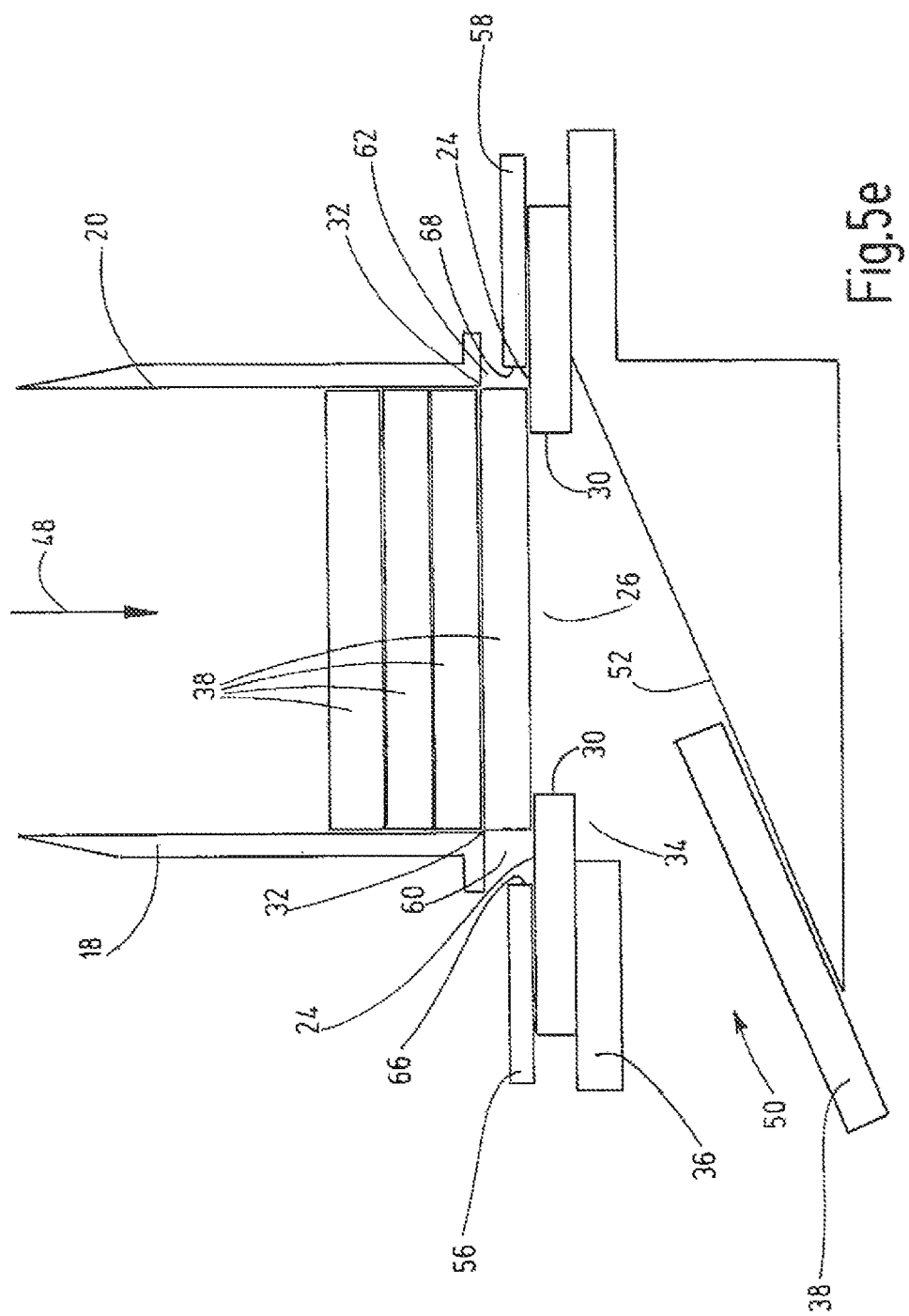

FIG. 5*a* shows the initial position, in which five identification-plaque sets 38, for example, which lie one above the other, are received in the magazine 14, and wherein the lowermost identification-plaque set 38 rests on the portions of the support surface 24 bounding the inlet opening 26 on the left and right. The pusher elements 56, 58 are likewise in their initial position and likewise rest respectively on the support surface 24. In a first step (FIG. 5*b*) the pusher arrangement 54 is moved linearly to the right, so that the first pusher element 56 reaches a forward position, in which its front edge 66 turned toward the inlet opening 26 is flush with the left rim portion 30 or extends slightly beyond the inlet opening 26. Perpendicular to the support surface 24 and thus also perpendicular to the transport direction 48, the pusher elements 56, 58 have a thickness that is smaller than the thickness of the identification-plaque sets 38, so that they act only on the lowermost identification-plaque set 38 and displace this relative to the other identification-plaque sets 38. The guide walls 18, 20 act against any displacement of the further identification-plaque sets 38. During the displacement of the lowermost identification-plaque set 38, its right end is inserted into the slot 62 of the second guide wall 20, through which the second pusher element 58 can also be passed. As illustrated schematically in FIG. 5*c*, the left end tilts downward into the inlet opening 26 while the pusher arrangement 54 is being moved in the opposite direction, so that the lowermost identification-plaque set 38 is pushed into the inlet opening 26. In FIG. 5*d* it is illustrated how the second pusher element 58 in its forward position is disposed flush with the right rim portion 30, so that the lowermost identification-plaque set 38 disappears completely into the inlet opening 26 and falls onto the slideway 52. FIG. 5*e* in turn shows the initial position, in which the upper four identification-plaque sets have slipped downward and the identification-plaque set that has been pushed through the inlet opening 26 is sliding down the slideway 52.

The principle described above is usable not only when, as in the exemplary embodiment shown in FIG. 1*a*, 1*b*, the transport direction 48 runs perpendicularly downward. To the contrary it is also possible for the transport direction 43 to run in horizontal direction, for example, although then the force of gravity is not involved in the transport of the identification-plaque sets 38 through the inlet opening 26 into the chute 50. In FIG. 4, an alternative exemplary embodiment, in which the transport direction 48 runs horizontally, is illustrated for the magazine 114. It is almost identical to the magazine according to the first exemplary embodiment illustrated in FIG. 1*a*, 1*b*, 3, and so like parts are denoted with like reference symbols. However, it additionally has a cover 70, against which a compression spring 72 is braced that supports a feed plate 74, which by means of the spring 72 urges the identification-plaque sets 38 in the transport direction 48 with force. This force of the spring 72 is equivalent to the force of gravity.

It is self-evident that numerous changes are possible compared with the shown exemplary embodiments. Thus the transport direction 48 may also be inclined at any desired angle to the horizontal. Especially with an inclination of the transport direction 48 at an acute angle to the horizontal, for example at an angle of 30° to 45°, it is possible for only one of the pusher elements 56 to be present, which then pushes the identification-plaque sets 38 in a first step obliquely upward on the support surface 24. During the slipping back of the identification-plaque set 38 under the force of gravity after withdrawal of the pusher element 56, this can automatically drop into the inlet opening 26 without needing the second pusher element 58. Furthermore, a safety circuit may be provided that turns off the inscription instrument when the magazine 14, 114 is not closed sufficiently light-tightly, especially when the cover 70 is raised. This is particularly advantageous when a laser inscription instrument is directed at the identification-plaque set 38 that is disposed closest to the inlet opening 26 in the magazine 14, 114 since its laser light may penetrate between the identification plaques 42. In addition, the guide walls 18, 20 do not necessarily have to run parallel to one another, but they may decrease their mutual spacing along the transport direction 48, especially until their lower rims 32 have a spacing relative to one another that corresponds to the length of the identification-plaque sets 38. In addition, it is not mandatory that the support surface 24 be a component of the magazine 14, 114, but instead it may also be disposed on the cover wall 36 of the housing 12. In this case in particular it is possible for the spacing of the rim portions 30 relative to one another to be variable, so that the device 10 is usable for identification-plaque sets or other identification units of different size. Finally, it is possible for the spacing of the guide walls 18, 20 relative to one another to be variable, in order to match the magazine 14, 114 to the size of various identification-plaque sets 38. Last but not least, it must be pointed out that not only identification-plaque sets 38 may be received in the magazine 14, 114, but so also may other identification units, which consist, for example, only of one large identification plaque.

In summary, the following may be asserted: The invention relates to a device 10 for inscription of identification units 38, wherein each identification unit 38 has one identification plaque 42 or several identification plaques 42 joined together in one piece, wherein each identification plaque 42 has an inscription surface 44 and wherein the inscription surface 44 or several of the inscription surfaces 44 of each identification unit 38 spans or span an inscription plane, with a magazine 14, 114 for receiving of a large number of identification units 38 resting on one another with their inscription planes aligned parallel to one another, which magazine has, for the identification units 38, two guide walls 18, 20, which run parallel at a spacing relative to one another or which decrease the mutual spacing along a transport direction 48 running perpendicular to the inscription planes, with a support surface 24 for the identification units 38 disposed in the transport direction 48 downstream from the guide walls 18, 20, with an inscription instrument for inscription of the inscription surfaces 44, with a chute 50 accessible via an inlet opening 26 in the support surface 24 for transport of the identification units 38 to the inscription instrument and/or to a removal point, wherein the peripheral rim 28 of the inlet opening 26 has two rim portions 30, which are disposed opposite one another and the spacing of which relative to one another is smaller than the spacing, relative to one another, of the rims 32 of the guide walls 18, 20 turned toward the support surface 24, and with a pusher arrangement 54 disposed above the support surface 24 and having at least one pusher element 56, 58, wherein the at least one pusher element 56, 58 is displaceable from a retracted position at a spacing from the associated rim portion 30 into a forward position, in which its edge 66, 68 turned toward the inlet opening 26 is flush with the associated rim portion 30 or projects beyond this.

LIST OF REFERENCE SYMBOLS

10 Inscription device
12 Housing
14 Magazine
16 Snap-in hook
18, 20 Guide walls
22 Transverse wall
24 Support surface
26 Inlet opening
28 Peripheral rim
30 Rim portion
32 Lower rim
34 Opening
36 Cover wall
38 Identification-plaque set
40 Carrier
42 Identification plaque
44 Inscription surface
46 Inscription platelets
48 Transport direction
50 Chute
52 Slideway
54 Pusher arrangement
56, 58 Pusher element
60, 62 Slot
64 Frame
66, 68 Edge
70 Cover
72 Compression spring
74 Feed plate
114 Magazine

The invention claimed is:

1. Device for inscription of identification units, wherein each identification unit has one identification plaque or several identification plaques joined together in one piece, wherein each identification plaque has an inscription surface and wherein the inscription surface or several of the inscription surfaces of each identification unit spans or span an inscription plane, with a magazine for receiving of a large number of inscription planes of identification units resting on one another and aligned parallel to one another, which magazine has, for the identification units, two guide walls, which run parallel at a spacing relative to one another or which decrease the mutual spacing along a transport direction running perpendicular to the inscription planes, with a support surface—for the identification units disposed in the transport direction downstream from the guide walls, with an inscription instrument for inscription of the inscription surfaces, with a chute accessible via an inlet opening in the support surface for transport of the identification units to at least one from the group consisting of the inscription instrument and a removal point, wherein the peripheral rim of the inlet opening has two rim portions, which are disposed opposite one another and the spacing of which relative to one another is smaller than the spacing, relative to one another, of the rims of the guide walls turned toward the support surface, and with a pusher arrangement having at least one pusher element disposed above the support surface, wherein the at least one pusher element is displaceable from a retracted position at a spacing from the associated rim portion into a forward position, in which its edge turned toward the inlet opening is flush with the associated rim portion or projects beyond this such that via the displacement the at least one pusher element pushes directly against the identification unit resting on the support surface.

2. Device according to claim 1, wherein the at least one pusher element has a smaller thickness, measured perpendicular to the support surface, than the identification units.

3. Device according to claim 1, wherein the pusher arrangement has two pusher elements disposed at a spacing relative to one another that is larger than the mutual spacing of the rim portions, and wherein each of the pusher elements is displaceable from a retracted position at a spacing from the associated rim portion to a forward position, in which its edge turned toward the inlet opening is flush with the associated rim portion or projects beyond this.

4. Device according to claim 3, wherein the mutual spacing of the pusher elements is at least as large as the mutual spacing of the rims of the guide walls turned toward the support surface.

5. Device according to claim 3, wherein the pusher elements are rigidly connected to one another.

6. Device according to claim 1, wherein the at least one pusher element engages through at least one slot in the associated guide wall.

7. Device according to claim 1, wherein the rim portions disposed opposite one another are movable relative to one another for variation of the size of the inlet opening.

8. Device according to claim 1, comprising a housing enclosing the inscription instrument and the chute.

9. Device according to claim 8, wherein the magazine is connected detachably with the housing or is inserted loose into a holder on the housing.

10. Device according to claim 1, wherein the support surface, as part of the magazine, is securely connected with the guide walls.

11. Device according to claim 1, wherein the guide walls run perpendicularly or in sloping manner from top to bottom, and wherein the support surface is disposed under the guide walls.

12. Device according to claim 1, wherein the support surface is inclined relative to the horizontal.

13. Device according to claim 1, wherein the magazine has a spring-assisted feed element for displacement of the identification units in the transport direction and for pressing of the identification units onto the support surface.

14. Device according to claim 1, wherein a sloping plane inclined relative to the horizontal is disposed in the chute as a slideway for the identification units.

* * * * *